Figure 1:
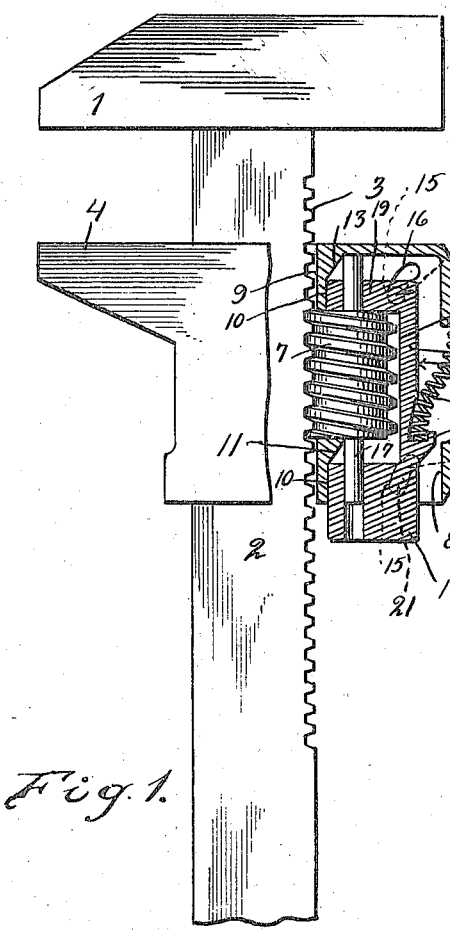

A. JENSEN.
WRENCH.
APPLICATION FILED MAY 19, 1917.

1,264,808.

Patented Apr. 30, 1918.

WITNESS
J. M. Jester

INVENTOR
A. Jensen

BY Victor J. Evans
ATTORNEY

UNITED STATES PATENT OFFICE.

AAGE JENSEN, OF PHILLIPS, WISCONSIN.

WRENCH.

1,264,808.

Specification of Letters Patent.

Patented Apr. 30, 1918.

Application filed May 19, 1917. Serial No. 169,700.

*To all whom it may concern:*

Be it known that I, AAGE JENSEN, a citizen of the United States, residing at Phillips, in the county of Price and State of Wisconsin, have invented new and useful Improvements in Wrenches, of which the following is a specification.

This invention relates to improvements in wrenches of that class in which the movable jaw is provided with a worm screw that co-engages between the teeth formed on the shank of the stationary jaw, and the object of the invention is to provide means whereby the worm may be readily brought out of engagement with the teeth of the shank to permit of a quick adjustment of the wrench and also wherein the worm is automatically brought to engage with the teeth of the said shank when the proper adjustment has been made between the jaws.

It is a further object of the invention to produce a device of this character which shall embody the desirable features of cheapness, strength and durability.

With the above and other objects in view the improvement resides in the construction, combination and arrangement of parts set forth in the following specification and falling within the scope of the appended claims.

Figure 2:
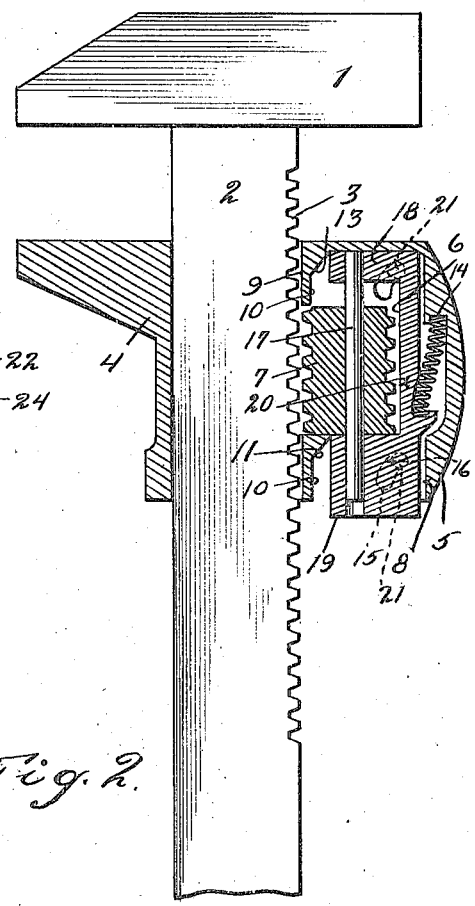
Figure 3:
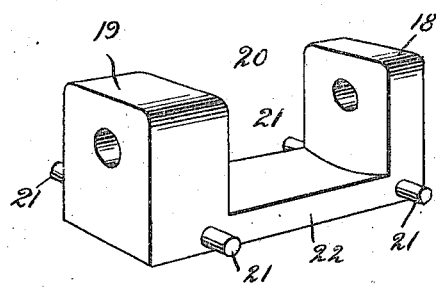

In the drawing:

Figure 1 is a side elevation of a wrench constructed in accordance with the present invention, Fig. 2 is an approximately central transverse section through the same, the dotted lines illustrating the arrangement of the parts when the worm is moved out of engagement with the tooth of the shank of the stationary jaw, and Fig. 3 is a perspective view of the slidable block.

Referring to the drawing in detail, the numeral 1 designates the stationary jaw of the wrench having the usual angular shank 2 connected therewith, the said shank being provided upon one of its edges with teeth 3. The movable jaw is indicated by the numeral 4, and has integrally formed therewith or connected thereto a carriage 5, the said carriage having a transverse opening 6 within which is arranged the screw 7 that is designed to co-engage with the teeth 3 of the shank 2.

In addition to the transverse opening 6 and, of course, in addition to the opening through which the shank 2 passes through the carriage 5, the said carriage is provided with a longitudinal passage 8 communicating with the transverse opening 6, the inner wall of the said passage 8 or the wall thereof adjacent the opening 9 through which the shank 2 passes is straight for a portion of its length, as indicated by the numeral 10, but is inclined, as at 11, to one of the end walls provided by the transverse opening 6 and is likewise inclined, as at 13, to the end of the carriage. The opposite or outer wall of the passage 8 may be straight but is provided with a notch or depression 14. The opposite sides of the carriage 5 are provided with transverse slots defining the straight walls 15 arranged parallel to the straight walls 10 of the passage 8 and the angular portions 16 arranged parallel or in a line with the angular walls 12 and 13.

The pintle or shaft for the worm 7 is indicated by the numeral 17, the worm 7 being keyed to the said shaft and the said shaft is received in bearing openings in the opposite angular ends 18 and 19 respectively in a slidable member or block 20. The block 20 is provided with laterally extending lugs 21 respectively, and the said lugs may be surrounded by anti-frictional sleeves if desired. The block is designed to be received in the passage 8 and to have the edges of its angular members 18 and 19 rest normally upon the straight walls 10 of the passage 8, while the lugs 21 are normally received in the straight passages 15 of the transversely arranged angular slots of the carriage.

The connecting element or member 22 for the angular ends 18 and 19 of the block 20 is preferably provided with an offset lug upon its outer edge, as indicated by the numeral 23, and this lug is formed with a depression to receive one end of a helical spring 24, the opposite end being received in the pocket 14 of the carriage and if desired entering a suitable depression in one of the end walls provided by the said pocket.

By reference to the drawings it will be noted that the spring 24 exerting a tension between the wall of the pocket 14 and the lug 23 normally moves the block 20 to bring the teeth or threads of the worm 7 into engagement between the teeth 3 of the shank 2. It will be also noted that the end 19 is of a materially greater length than the end 18 of the block 20, so that the end 19 extends a suitable distance through the passage 8. This projecting end provides means whereby a pressure may be exerted upon the block 20 to slide the same longitudinally or inwardly of the carriage 5. A pressure upon the block will cause the lugs 21 to travel in the angular portions 16 of the slots in the carriage and also cause the outer ends of the portions 18 and 19 of the block to ride upon the angular walls 12 and 13 of the passage and consequently move the block against the pressure of the spring 24 to bring the threads or teeth of the worm out of engagement with the teeth 3 of the shank 2, and in this manner permit of the rapid adjustment of the jaw 4 with respect to the jaw 1. When the block 20 is relieved from pressure the spring 24 will automatically slide the block to its initial position, again bringing the worm to engage with the teeth of the shank so that minute adjustments between the jaws 1 and 4 may be made by turning the worm 7 upon the teeth 3, as will, it is thought, be readily understood.

Having thus described the invention, what I claim is:

1. In a device for the purpose set forth, a stationary jaw having a toothed shank, a movable jaw including a carriage arranged for slidable movement upon the shank, a worm on the carriage co-engaging with the teeth of the shank, a slidable block supporting said worm, spring means for normally moving the block laterally of the carriage to bring the worm to engage with the teeth of the shank, and means between the carriage and the block designed when the block is moved longitudinally against the pressure of the spring to slide said block in an outward lateral direction, to bring the worm out of engagement with the teeth of the shank.

2. In combination with a stationary jaw having an angular toothed shank, and a second jaw including a carriage arranged for slidable movement upon the shank, said carriage having a transverse and a longitudinal passage, said carriage having laterally arranged angular slots communicating with the passage, a block in the passage, a worm, a shaft for the worm loosely received in bearing openings in the block, lateral lugs upon the block designed to be received in the referred to angular slots, spring means for moving the block in one direction, whereby to bring the worm into engaging position with the teeth of the shank, and said block, when subject to pressure in a longitudinal direction designed to slide on the shaft and by virtue of the engagement of the lugs on the said block in the angular slots in the carriage to be moved laterally of the carriage against the pressure of the spring, carry the shaft and worm therewith to bring the latter out of engagement with the teeth of the shank.

3. In a wrench, the combination with a stationary jaw having a toothed shank, a second jaw having a carriage slidably mounted upon the shank, said carriage having a transverse opening and a longitudinal passage communicating with the opening, the inner straight wall of the said passage having angular portions one communicating with the referred to transverse opening and the other communicating with the other end of the passage, the outer wall of the passage having a pocket, said carriage having transverse angular slots communicating with the passage and defining straight portions agreeing with the straight portions of the inner walls of the passage and angular portions agreeing with the angular portions of the said inner wall of the passage, a longitudinally movable block within the passage having angular ends and one of said ends normally projecting through the passage, a shaft passing loosely through the said angular ends of the block, a worm keyed to the shaft, and means comprising a spring member between the pocket of the passage and the said block for normally sliding the block both laterally and longitudinally in one direction through the passage to bring the worm in engaging position with the teeth of the shank and one end of said block through the open end of the carriage.

In testimony whereof I affix my signature.

AAGE JENSEN

Copies of this patent may be obtained for five cents each, by addressing the "Commissioner of Patents, Washington, D. C."